US012690115B2

(12) United States Patent
Trillo Diaz

(10) Patent No.: US 12,690,115 B2
(45) Date of Patent: Jul. 21, 2026

(54) METHOD FOR OPERATING A LIGHTING ARRANGEMENT

(71) Applicant: Arnold & Richter Cine Technik Gmbh & Co. Betriebs KG, Munich (DE)

(72) Inventor: Benjamin José Trillo Diaz, Bruckmühl (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 212 days.

(21) Appl. No.: 18/597,015

(22) Filed: Mar. 6, 2024

(65) Prior Publication Data

US 2024/0314914 A1 Sep. 19, 2024

(30) Foreign Application Priority Data

Mar. 17, 2023 (DE) ......................... 102023106798.2

(51) Int. Cl.

*H05B 47/175* (2020.01)
*H05B 47/18* (2020.01)
*H05B 47/185* (2020.01)

(52) U.S. Cl.

CPC ....... *H05B 47/1965* (2024.01); *H05B 47/184* (2024.01); *H05B 47/187* (2024.01)

(58) Field of Classification Search

CPC ...... H05B 47/155; H05B 45/20; H05B 47/19; H05B 45/10; H05B 47/105; H05B 47/196; H05B 47/1985; H05B 47/1965; H05B 45/46; H05B 47/11; H05B 45/375; H05B 47/115; H05B 47/12; H05B 47/197; H05B 47/10; H05B 47/187; H05B 47/198; H05B 47/175; H05B 47/184; H05B 47/199; H05B 47/165; H05B 45/24; H05B 45/37; H05B 45/58; H05B 47/18; H05B 47/22; H05B 45/18; H05B 45/325; H05B 45/56; H05B 47/135; H05B 47/16; H05B 47/1995; F21V 21/30; F21V 23/0442; F21V 29/763; F21V 14/02; F21V 15/01; F21V 21/00; F21V 21/15; F21V 29/56; F21V 19/0015; F21V 23/04; F21V 23/0435; F21V 29/51;

(Continued)

(56) References Cited

U.S. PATENT DOCUMENTS

| | | | |
|---|---|---|---|
| 9,743,497 | B2 | 8/2017 | Keirstead et al. |
| 11,306,901 | B2 | 4/2022 | Jeswani et al. |

(Continued)

FOREIGN PATENT DOCUMENTS

| | | | |
|---|---|---|---|
| DE | 102012204307 | B4 | 12/2013 |
| DE | 102020113285 | A1 | 11/2020 |

(Continued)

OTHER PUBLICATIONS

Extended European Search Report from corresponding European Application No. 24162845.2 dated Oct. 22, 2024.

*Primary Examiner* — Monica C King
(74) *Attorney, Agent, or Firm* — Lando & Anastasi, LLP

(57) ABSTRACT

A method and apparatus for operating a lighting arrangement comprising lighting fixtures and lighting fixture arrays composed of lighting fixtures, wherein the lighting fixtures or lighting fixture arrays of the lighting arrangement are controlled by means of an extractable hardware user interface.

30 Claims, 6 Drawing Sheets

(58) Field of Classification Search
CPC ...... F21S 2/005; F21S 4/28; F21S 9/02; F21S 9/04; F21S 2/00; F21S 10/02; F21S 6/00; F21S 6/004; F21S 8/04; F21S 8/086; F21S 9/024; F21S 9/043
See application file for complete search history.

(56) References Cited

U.S. PATENT DOCUMENTS

| | | | | |
|---|---|---|---|---|
| 11,885,483 | B2 | 1/2024 | Tiefel et al. | |
| 2018/0112858 | A1* | 4/2018 | Bowden | F21V 29/74 |
| 2021/0112647 | A1* | 4/2021 | Coleman | G01S 17/42 |
| 2022/0070989 | A1* | 3/2022 | Rodriguez | H04W 4/80 |

FOREIGN PATENT DOCUMENTS

| | | | |
|---|---|---|---|
| DE | 102020105692 | A1 | 9/2021 |
| EP | 3576499 | B1 | 3/2021 |
| JP | 2020080321 | A | 5/2020 |

* cited by examiner

METHOD FOR OPERATING A LIGHTING ARRANGEMENT

FIELD OF THE INVENTION

The invention relates to a method for operating a lighting arrangement comprising lighting fixtures and lighting fixture arrays.

BACKGROUND OF THE INVENTION

A lighting system can comprise a plurality of lighting fixtures such as lamp heads. In a conventional lighting system it is neither possible to control nor to set up lighting fixtures connected in a network of the system through a handheld detached control panel for remote operation. Further, it is not possible for different lighting modules to share one unique DMX profile to control them through a lighting console of the lighting system as one lighting fixture instead of multiple separate lighting fixtures.

Conventional lighting systems do not allow grouping several units or lighting fixtures such that they behave in the same network as separate groups of lighting fixtures together with individual lighting fixtures, all of them individually controllable and acting as separate fixture entities. Moreover, conventional lighting systems do not offer the possibility to integrate remote control panel hardware that allows for modularity configuration into a fixture housing via an integrated bay.

SUMMARY OF CERTAIN INVENTIVE ASPECTS

Accordingly it is an object of the present invention to overcome the above mentioned drawbacks of a conventional lighting system and to facilitate the configuration and operation of a lighting system.

The invention provides according to a first aspect a method for operating a lighting arrangement comprising lighting fixtures and lighting fixture arrays, wherein the lighting fixtures and/or lighting fixture arrays of the lighting arrangement are controlled by means of an extractable hardware user interface.

In a possible embodiment of the method according to the first aspect of the present invention the extractable hardware interface is extracted from an inbuilt bay of a lighting fixture of said lighting arrangement.

In a possible embodiment of the method according to the first aspect of the present invention a lighting fixture array comprises a number, M, of lighting fixtures mounted together in a yoke.

In a possible embodiment of the method according to the first aspect of the present invention if the extractable hardware user interface is put into an integrated bay of a lighting fixture it operates as a local onboard user interface for controlling operations of the respective lighting fixture or for controlling operations of a lighting fixture array comprising the respective lighting fixture.

In a possible embodiment of the method according to the first aspect of the present invention setup operations and lighting operations of lighting fixtures and/or of lighting fixture arrays within the lighting arrangement are controlled manually by a user by means of the extractable hardware user interface.

In a possible embodiment of the method according to the first aspect of the present invention the lighting fixtures and/or lighting fixture arrays can after setup be controlled remotely by the extractable hardware user interface or by a console of a lighting system via a control interface in accordance with a communication protocol.

In a possible embodiment of the method according to the first aspect of the present invention the communication protocol comprises a DMX communication protocol having a predetermined number, k, of available DMX channels.

In a possible embodiment of the method according to the first aspect of the present invention a number of DMX channels reserved for a lighting fixture array depends on the number, M, of lighting fixtures mounted together in the respective lighting fixture array.

In a possible embodiment of the method according to the first aspect of the present invention a number, M, of lighting fixtures are serially interconnected via cables, in particular via Ethernet cables, to form a composite lighting fixture array of the lighting arrangement.

In a possible embodiment of the method according to the first aspect of the present invention the serially connected cables are provided for transmitting control signals between the lighting fixtures of the lighting fixture array and the extractable hardware user interface and/or between the lighting fixtures of the lighting fixture array and a console of the lighting system.

In a possible embodiment of the method according to the first aspect of the present invention the lighting fixtures serially interconnected via the cables are configured by a user by means of the extractable hardware user interface as lighting fixtures to be operated as a single lighting device in a recognized or assigned connection order or as lighting fixtures to be operated independently.

In a possible embodiment of the method according to the first aspect of the present invention a connection order of the serially interconnected lighting fixtures is recognized automatically depending on a detected cable length of the connecting cables and/or depending on an internal wiring of the connecting cables.

In a possible embodiment of the method according to the first aspect of the present invention the cables interconnecting the lighting fixtures are color coded.

In a possible embodiment of the method according to the first aspect of the present invention the color-coded cables provided for serially interconnecting the lighting fixtures each indicate a cable length of the cable and/or a connection order of the cables within the lighting arrangement.

In a possible embodiment of the method according to the first aspect of the present invention a lighting fixture array comprises a configurable array topology describing the structural arrangement of the lighting fixtures within the lighting fixture array.

In a possible embodiment of the method according to the first aspect of the present invention each lighting fixture of the lighting fixture array has a position within the arrangement topology of the lighting fixture array assigned to the respective lighting fixture and adjustable as a configuration parameter.

In a possible embodiment of the method according to the first aspect of the present invention a lighting fixture array composed of lighting fixtures is controlled by the console of the lighting system via assigned DMX channels of the communication protocol according to set configuration parameters of a DMX profile for simultaneous setting of all lighting fixtures of the lighting fixture array.

In a possible embodiment of the method according to the first aspect of the present the lighting fixtures are mechanically connected to each other as lighting modules to form the composite lighting fixing array by means of mechanical connection elements.

In a possible embodiment of the method according to the first aspect of the present invention the mechanical connecting elements are provided in a frame of the lighting fixtures.

In a possible embodiment of the method according to the first aspect of the present invention the mechanically assembled lighting fixtures form a unitary two-dimensional lighting surface of the lighting fixture array In a possible embodiment of the method according to the first aspect of the present invention the mechanically assembled lighting fixtures are powered by associated power supply units connected to a common power supply socket of the lighting fixture array.

In a possible embodiment of the method according to the first aspect of the present invention the lighting fixtures comprise high power lighting fixtures each having a power consumption of more than 500 Watt.

In a possible embodiment of the method according to the first aspect of the present invention control signals are transmitted between a lighting arrangement of lighting fixtures configured as a controllable lighting device and other lighting devices of the lighting system via a common bus, in particular a common serial bus, or via a wireless or wired data network.

In a possible embodiment of the method according to the first aspect of the present invention the extractable hardware user interface comprises a graphical user interface.

In a possible embodiment of the method according to the first aspect of the present invention the lighting fixtures comprise light panels, dimmers, light heads, spotlights, scanners, strobes, laser devices and moving heads and lighting modules that are mechanically connectable to each other.

In a possible embodiment of the method according to the first aspect of the present invention each controllable lighting fixture or controllable lighting fixture array of the lighting system is controlled by means of an associated assigned bus address for reception of control signals.

In a possible embodiment of the method according to the first aspect of the present invention a configuration file of a user mode generated for a lighting fixture array is stored in a configuration memory of a lighting fixture of the lighting arrangement and/or in a configuration memory of the extractable hardware user interface connected to an inbuilt bay of a lighting fixture of the lighting fixture array and/or in a configuration memory of the console of the lighting system.

In a possible embodiment of the method according to the first aspect of the present invention each controllable lighting fixture or lighting fixture array of the lighting system comprises a unique device identifier (ID) for identification of the respective controllable lighting fixture or lighting fixture array by a controller, in particular by a remote device management (RDM) controller.

In a possible embodiment of the method according to the first aspect of the present invention, a lighting fixture array composed of lighting fixtures reports its structural composition and/or its arrangement topology to the lighting system console and/or to the extractable hardware user interface and receives a unique identifier (ID).

The invention provides according to a further aspect an extractable hardware user interface apparatus comprising a processor adapted to perform a method for operating a lighting arrangement comprising lighting fixtures and lighting fixture arrays, wherein the lighting fixtures and/or lighting fixture arrays of the lighting arrangement are controlled by means of the extractable hardware user interface device.

BRIEF DESCRIPTION OF THE DRAWINGS

Embodiments of the different aspects of the present invention are described in following in more detail with respect to the figures.

DETAILED DESCRIPTION OF THE INVENTION

The invention provides according to a first aspect a method for operating a lighting arrangement comprising lighting fixtures and lighting fixture arrays, wherein the lighting fixtures and/or lighting fixture arrays of the lighting arrangement are controlled by means of an extractable hardware user interface.

Figure 1:
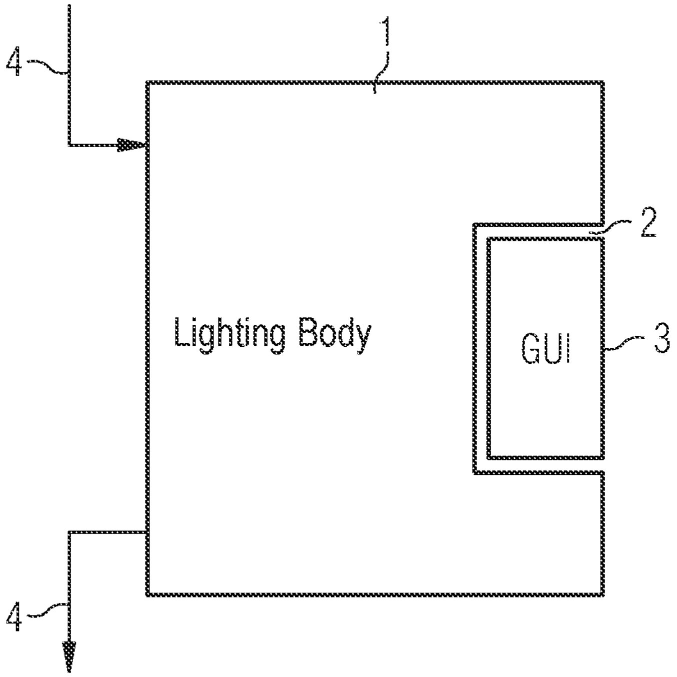
FIG. 1 shows schematically a lighting comprising an extractable hardware user interface for illustrating a possible embodiment of the present invention.

FIG. 1 shows a schematic block diagram of a lighting fixture 1 comprising a bay 2 to receive an extractable hardware user interface 3. The lighting fixture 1 is serially connected in a daisy chain by means of cables 4 with other fixtures of a lighting system 5.

The lighting fixtures 1 of a lighting system 5 can comprise for instance light panels, dimmers, light heads, spotlights, scanners, strobes, laser devices and moving heads and lighting modules that are mechanically connectable to each other. The extractable hardware user interface 3 can be extracted in a preferred embodiment manually by a user from the inbuilt bay 2 of a lighting fixture 1 of a lighting arrangement. As soon as the extractable hardware user interface 3 is put or plugged by a user back into the integrated bay 2 of a lighting fixture 1 it may operate as a local onboard user interface for controlling or monitoring operations and lighting tasks of the respective lighting fixture 1 or for controlling or monitoring operations of a lighting fixture array 6 comprising the respective lighting fixture 1.

Figure 2:
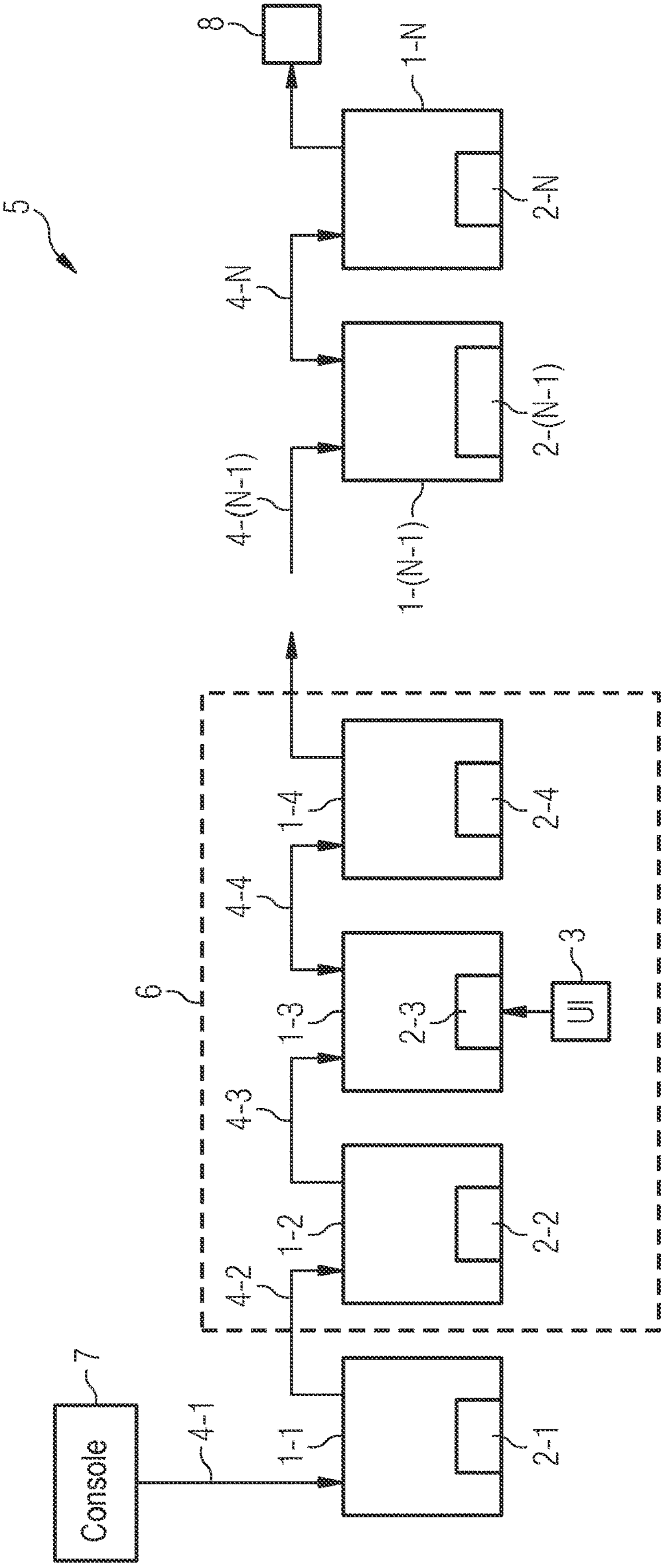
FIG. 2 shows an exemplary embodiment of a lighting system comprising a string of lighting fixtures for illustrating a possible embodiment of the present invention.

FIG. 2 shows schematically an exemplary embodiment of a lighting system 5 including a single string of lighting devices connected to a console 7 of the lighting system 5. In the illustrated example the string of lighting devices comprises an array 6 composed of three serially connected lighting fixtures 1-2, 1-3, 1-4. The other lighting devices comprise lighting fixtures 1-*i*. In the illustrated embodiment the string of serially connected lighting fixtures 1 comprises a number N of fixtures 1 interconnected through cables 4. The string is terminated by a resistor 8 having a resistance e.g., 120 Ohm to suppress signal reflections.

As can be seen in FIG. 2 at least some of the serially connected lighting fixtures 1 comprise an inbuilt bay 2 for receiving a hardware user interface 3 which can be plugged by a user into a socket or unplugged by the user from the socket to form a handheld hardware user interface control panel. As illustrated in FIG. 2 the hardware user interface 3 can be plugged into the bay 2-3 of fixture 1-3 forming part of the lighting fixture array 6 including three assembled fixtures 1-2, 1-3, 1-4.

In a possible implementation the extractable hardware user interface control panel 3 shown in FIG. 2 can operate in different operation modes. In a first mode, the hardware user interface 3 operates as a local user interface of a lighting fixture 1. In a second mode, the hardware user interface 1 operates as control panel for a lighting fixture array 6 comprising several lighting fixtures 1. For example after having been plugged by a user into a bay 2 of a fixture 1 the hardware user interface 1 may automatically operate as the local interface of the respective fixture 1.

After having been unplugged by a user, the hardware user interface 3 may operate as a handheld portable control panel 3 for a group of fixtures 1. For this purpose a wireless link between a fixture 1 of the group and the removed handheld control panel 3 can be established. The hardware user interface 3 can in a possible embodiment detect automatically whether it has been plugged into a socket of a lighting fixture 1 or whether it has been unplugged and can switch automatically between both operation modes.

Other implementations are possible. For instance a user can decide after having plugged in the hardware user interface 3 into a socket of an inbuilt bay 2 of a lighting fixture 1 forming part of an array 6 whether the plugged-in hardware user interface 3 shall operate as a local on-board interface of the respective lighting fixture 1 or as an interface of the whole array 6 of wired lighting fixtures 1. A selection button can be displayed on the GUI of the hardware user interface 3 to the user to perform this selection.

The extractable hardware user interface apparatus 3 comprises a housing having data and control pins which can in a possible embodiment be plugged into pin holes of a corresponding socket provided in an inbuilt bay 2 of a fixture housing of a lighting fixture 1. The extractable hardware user interface 3 can form after its extraction from the socket a handheld apparatus which can be used by a user to control manually a configuration and/or an operation of lighting fixtures 1 as separate fixtures or as integrated fixtures of a composite lighting fixture array 6 of the lighting system 5.

The lighting system 5 according to an aspect of the present invention allows for the attachment of multiple independent lighting fixtures 1 such as lamp heads as one single lighting fixture array 6 via hardware tools. The lighting system 5 allows the grouping of all lamp heads via a networking system, so that they can operate control-wise as a single composite lighting fixture 1. This feature does not only allow the control of multiple lighting fixtures 1 each as a single lighting fixture in a specific network, but also the setup of multiple groups or arrays of lighting fixtures 1—so that each group or array can behave as a single lighting fixture 1.

The arrangement is only restricted by the number M of lighting fixtures such as lamp heads that can be connected and daisy-chained together hardware-wise in a string as also illustrated in FIG. 2. Therefore, limits are the physical weight of the mounted lighting fixture array 6, the feasibility of interconnection, and the maximum power consumption for a specific mains power supply of the assembled lighting fixture array 6.

The configuration of the different entities of the lighting system 5 can be done directly by means of a control panel formed by the extractable hardware user interface apparatus 3 of a lighting fixture 1. The hardware user interface apparatus 3 can comprise a graphical user interface GUI having a display with a touch screen that allows a user both to group and to ungroup different lighting fixtures 1 such as lamp heads or light panel modules. A user can also decide on the order for each lamp head inside of a group or array 6 (in terms of priority, DMX control, RDM, etc.). This setup implementation can be related to any kind of lighting-specific professional network protocol, including ArtNet, sACN, and RDMNet.

The method according to the present invention also applies in those scenarios in which an extractable control panel is not used for the setup of the lighting system 5 but only for the control of the lighting system 5 during its operation. A setup of the lighting system 5 might be performed previously for instance by using a laptop, computer, tablet or any other kind of smart device. The method according to the present invention is designed for both USITT DMX-512A control via a DMX specification and for direct manual control via the extractable user interface 3 with a display or with any smart digital device. The method is suitable in particular for any application or use case where two or more lighting fixtures 1 must be grouped together in a networking scenario.

In a possible embodiment of the present invention setup operations and lighting operations of lighting fixtures 1 and/or of lighting fixture arrays 6 within the lighting arrangement are controlled manually by a user by means of the hardware user interface 3. The lighting fixtures 1 and/or lighting fixture arrays 6 can after the setup has been accomplished be controlled manually by the user by means of the extracted handheld hardware user interface 3.

The lighting fixtures 1 and/or lighting fixture arrays 6 can after setup also be controlled remotely by a console 7 of the lighting system 5 via a control interface in accordance with a communication protocol as also illustrated in FIG. 2. In a possible embodiment the employed communication protocol comprises a DMX communication protocol having a predetermined number, k, of available DMX channels. Each DMX channel can comprise an associated channel name.

The number of DMX channels reserved for a lighting fixture array 6 depends on the number, M, of lighting fixtures 1 mounted together in the respective lighting fixture array 6. This number can change depending on the number of lighting fixtures 1 in the assembled lighting fixture array 6. In a lighting system 5 according to the present invention, the DMX profile (amount of channels) can automatically be changed depending on the size of the lighting fixture array 6 as defined and wired by the user.

Moreover, the lighting system 5 can avoid that a user commits a configuration error by configuring a DMX profile that does only work for a lighting fixture array 6 composed of two or three lighting fixtures 1 in case that only one lighting fixture 1 is detected by the hardware user interface 3. This means that the extractable user interface 3 can recognize the DMX settings needed for the lighting fixture arrays 6 in the network of the lighting system 5, thus avoiding possible mistakes made by the user when configuring them for later use and control by the console 7 of the lighting system 5.

In a possible embodiment a lighting fixture array 6 comprises a number, M, of lighting fixtures 1 mounted together in a yoke. A number, M, of lighting fixtures 1 can be serially interconnected via cables 4, in particular via Ethernet cables, to form a composite lighting fixture array 6 of the lighting arrangement. In a possible embodiment the serially connected cables 4 are provided for transmitting control signals between the lighting fixtures 1 of the lighting fixture array 6 and the extractable hardware user interface 3 and/or between the lighting fixtures 1 of the lighting fixture array 6 and a console 7 of the lighting system 5.

The lighting fixtures 1 being serially interconnected via the cables 4 can be configured by a user by means of the extractable hardware user interface 3. The lighting fixtures 1 can be configured by the user as lighting fixtures to be operated as part of a composite lighting fixture array 6 in a recognized or assigned connection order or as separate lighting fixtures 1 to be operated independently from each other.

The serially connected cables 4 can be provided for transmitting control signals between the lighting fixtures 1 of the lighting fixture array 6 and the extractable hardware user interface 3 and/or between the lighting fixtures 1 of the lighting fixture array 6 and the console 7 of the lighting system 5. It is not necessary that the console 7 of the lighting system 1 is involved in controlling of the lighting fixtures 1 or lighting fixture arrays 6 of the respective lighting system 1.

If a user wants to manually control all lighting fixtures 1 assembled in a lighting fixture array 6, the only entity the user needs is one user interface control panel 3. This extractable user interface 3 can be purchased together with an associated lighting fixture 1 or can be purchased separately. The extractable hardware user interface 3 can be plugged into an inbuilt bay 2 of one of the lighting fixtures 1. However, if DMX needs to be employed, or lighting fixtures 1 from different manufacturers have to be controlled involvement of the console 7 of the lighting system 5 can be required.

In a possible embodiment a connection order of the serially interconnected lighting fixtures 1 is recognized automatically depending on a detected cable length of the connecting cables 4 and/or depending on an internal wiring of the connecting cables 4. In a possible embodiment the cables 4 interconnecting the lighting fixtures 1 can also be color coded. The color-coded cables 4 provided for serially interconnecting the lighting fixtures 1 can indicate a cable length of the cable 4 and/or a connection order of the cables 4 within the lighting arrangement. The cables 4 can comprise Ethernet cables.

Color coding of the cables 4 provides an additional feature so that a user does not have to employ the hardware user interface 3 to configure a lighting fixture array 6. The lighting system 5 may, in a possible embodiment, detect a difference between the cables 4 due to the internal wires or due to the cable length including the way the cables 4 are connected among each other. The hardware user interface 3 may ask the user in a displayed interactive dialogue whether the user wants to use a group of lighting fixtures 1 interconnected with each other by cables 4 as a composite lighting fixture array 6 in an automatically detected order or whether the user wants to use the interconnected lighting fixtures 1 as independent lighting fixtures, i.e., not forming part of a lighting fixture array.

The color coded cables 4 can support the user to understand which cable goes where during assembling a lighting fixture array 6. However, the advantages of the lighting system 5 according to the present invention are still high even when an automatic recognition is not implemented. In that case, users will create the lighting fixture arrays 6 via the extractable hardware user interface 3 and assign an order of the lighting fixtures 1 within the lighting fixture array 6, since no automatic detection results from the specific way of daisy-chaining the cables 4.

Figure 3A:
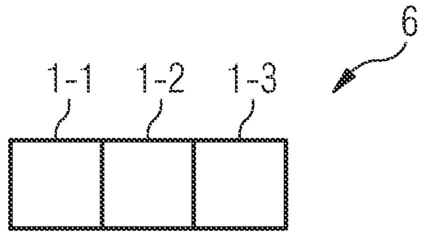
FIG. 3A, 3B show a schematic front and rear view on an exemplary embodiment of a lighting fixture array.
Figure 3B:
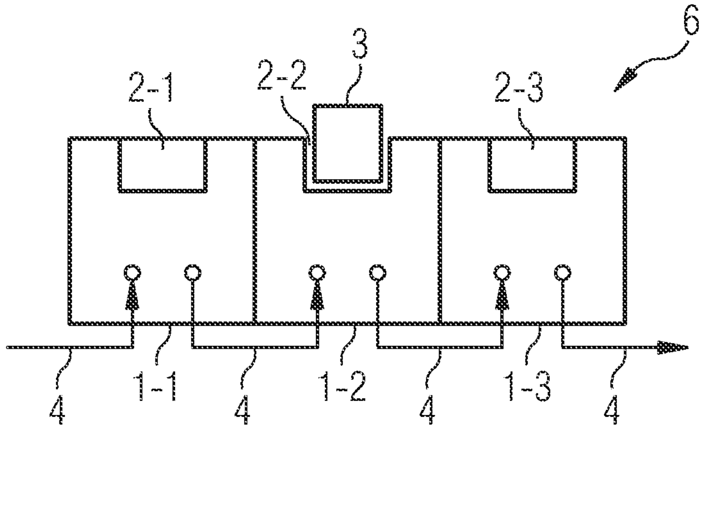

In a possible embodiment of the method according to the first aspect of the present invention a lighting fixture array 6 comprises a configurable array topology describing the structural arrangement of the lighting fixtures 1 within the lighting fixture array 6. Each lighting fixture 1 of the lighting fixture array 6 comprises a position within the arrangement topology of the lighting fixture array 6 assigned to the respective lighting fixture 1 and adjustable as a configuration parameter. For instance a composite lighting fixture array 6 may comprise three lighting fixtures (M=3) interconnected to each other though cables 4 as illustrated in FIGS. 3A, 3B.

Figure 4A:
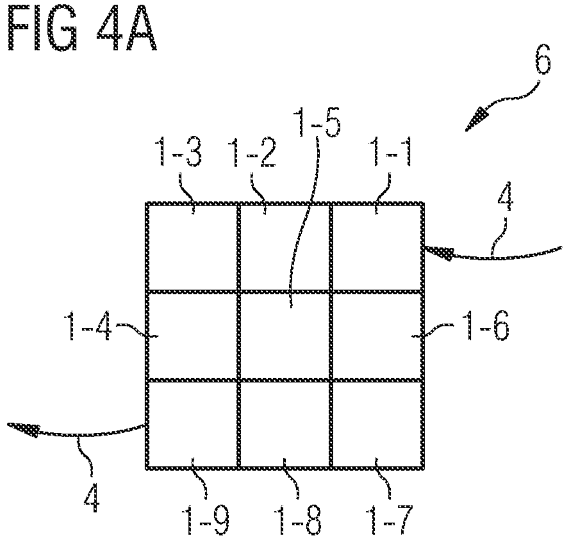
FIG. 4A, 4B show a schematic front view and rear view on an exemplary embodiment of a lighting fixture array.
Figure 4B:
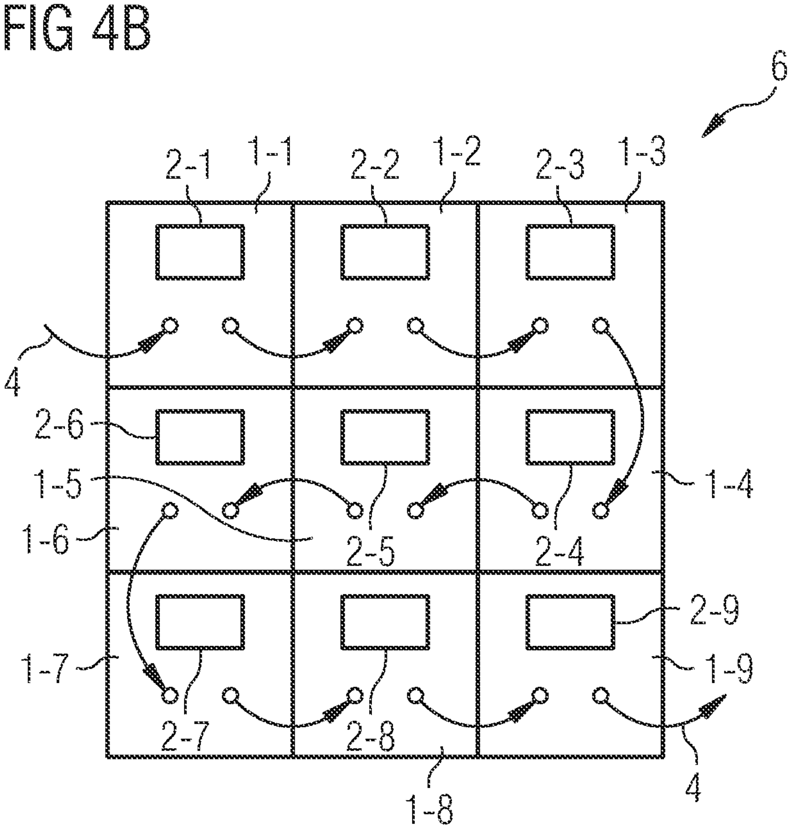

The composite lighting fixture array 6 may comprise in a possible embodiment a higher number of lighting fixtures 1 or lighting fixture modules 1. For instance a composite lighting fixture array may comprise nine (M=9) lighting fixture elements interconnected to form a lighting fixture array 6 having three adjacent rows and three adjacent columns of lighting fixtures elements 1 as illustrated in FIGS. 4A, 4B. The interconnected nine lighting fixture elements 1 can form together a plane lighting surface. FIG. 4A shows a font view on the assembled lighting fixture array 6 and FIG. 4B shows a rear view of the same wired lighting fixture array 6. The arrangement topology of the lighting fixture array 6 is in this case a 3×3 matrix of lighting fixtures 1.

Figure 5A:
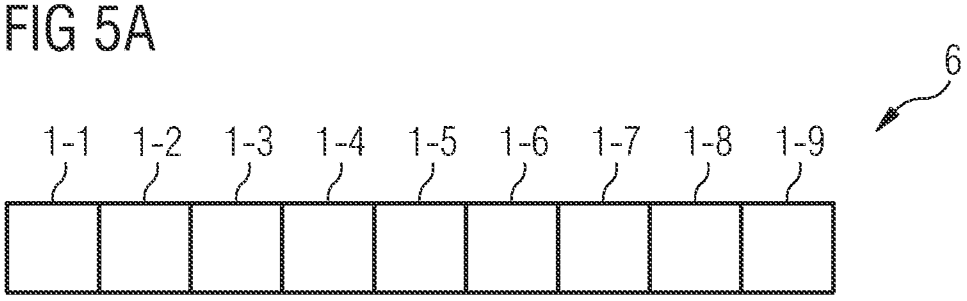
FIG. 5A, 5B show schematic front views on exemplary embodiments of a lighting fixture array.
Figure 5B:
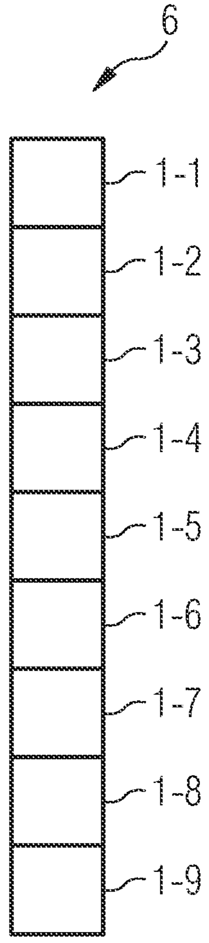

The same nine (M=9) lighting fixture elements 1 might also be interconnected serially in a single row as shown in FIG. 5A. In this case the arrangement topology of the lighting fixture array is a 9×1 matrix of lighting fixtures 1. If the nine lighting fixture elements are interconnected serially in a single column as illustrated in FIG. 5B the arrangement topology of the lighting fixture array is a 1×9 matrix of lighting fixtures 1.

Figure 6:
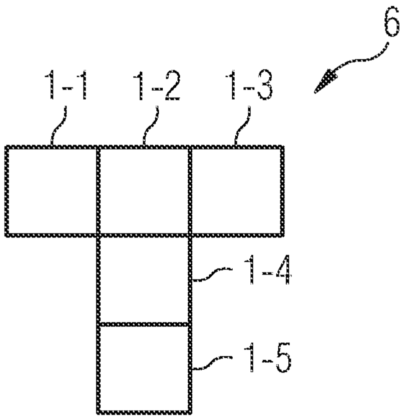
FIG. 6 shows schematic front view on an exemplary embodiment of a lighting fixture array.
Figure 7:
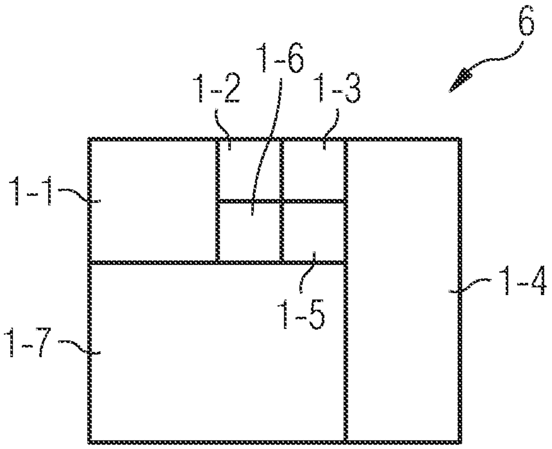
FIG. 7 shows a schematic front views on an exemplary embodiment of a lighting fixture array.

Other embodiments are possible. The lighting fixture elements 1 can, for instance, also be arranged in a T-shape as shown in FIG. 6 or a cross-shaped topology. The lighting fixture modules 1 of a lighting fixture array 6 may also comprise different sizes as illustrated in FIG. 7.

The lighting fixture array 6 comprises a configurable array topology describing the structural arrangement of the lighting fixtures 1 within the lighting fixture array 6. Each lighting fixture 1 of the lighting fixture array 6 has a specific position within the arrangement topology of the lighting fixture array 6. The position of a lighting fixture 1 within the array 6 may, in a possible embodiment, be automatically recognized by means of the interconnecting cables 4.

In an alternative embodiment a user can assign a position of a lighting fixture 1 within the array 6 as an adjustable configuration parameter of the lighting fixture 1 by using the extractable hardware user interface 3. For example a user can input a row number R and a column number C to specify a position of the lighting fixture element 1 or lighting fixture module 1 within the lighting fixture array 5. For instance the central lighting fixture element 1-5 in a 3×3 lighting array 6 as illustrated in FIGS. 4A, 4B has row number R=2 and column number C=2.

In a possible embodiment of the method according to the first aspect of the present invention a lighting fixture array 6 composed of lighting fixtures 1 is controlled remotely by the console 7 of the lighting system 5 via assigned DMX channels of the communication protocol according to set configuration parameters of a DMX profile for simultaneous setting of all lighting fixtures 1 of the lighting fixture array 6.

The lighting fixtures 1 can be mechanically connected to each other as lighting modules to form the composite lighting fixing array 6 by means of mechanical connection elements. The mechanical connecting elements are provided in a possible implantation in a frame of the lighting fixtures 1. In a possible embodiment the mechanically assembled lighting fixtures 1 form a unitary two-dimensional lighting surface of the lighting fixture array 6.

The mechanically assembled lighting fixtures 1 can be powered by associated power supply units connected to a common power supply socket of the lighting fixture array 6. The lighting fixtures 1 can comprise high power lighting fixtures each having a power consumption of more than 500 Watt. For instance, a lighting fixture array 6 comprising three lighting fixtures 1 might be supplied with electrical power by three different power supply units, not a common device, but the mains power is linked through the different lighting fixtures 1 in the lighting fixture array 6. Accordingly for the user, only one socket is needed to connect a supply power to up to e.g. three devices. These devices comprise high-power fixtures 1. Each luminaire or fixture 1 can have a total power consumption of e.g. 830 Watt.

In a possible embodiment control signals are transmitted between a lighting arrangement of lighting fixtures 1 configured as a controllable lighting device and other lighting devices of the lighting system 5 via a common bus, in particular a common serial bus, or via a wireless or wired data network.

In a possible embodiment, the extractable hardware user interface 3 comprises a graphical user interface. The display-based user friendly graphical user interface GUI allows a user to configure the modularity for different lighting fixtures 1 directly in one of the fixtures 1 or from a distance via cables 4.

The lighting fixtures 1 of the lighting system 5 can comprise light panels, dimmers, light heads, spotlights, scanners, strobes, laser devices and moving heads and lighting modules that are mechanically connectable to each other. Each controllable lighting fixture 1 or controllable lighting fixture array 6 of the lighting system 5 can be controlled by means of an associated assigned bus address for reception of control signals. The bus address assigned to a controllable device can comprise a DMX start address.

In a possible embodiment a configuration file of a user mode generated for a lighting fixture array 6 is stored in a configuration memory of a lighting fixture 1 of the lighting arrangement and/or is stored in a configuration memory of the extractable hardware user interface 3 connected to an inbuilt bay 2 of a lighting fixture 1 of the lighting fixture array 6 and/or is stored in a configuration memory of the console 7 of the lighting system 5.

In a possible implementation, a configuration file of a lighting fixture 1 comprises a configuration parameter to indicate whether the respective lighting fixture 1 forms part of a composite lighting fixture array 6 or forms an independent lighting fixture 1 operated independently from other lighting fixtures.

In a possible implementation the configuration file of a user mode of a composite lighting fixture array 6 is derived automatically from the configuration files of all lighting fixtures 1 forming part of the respective lighting fixture array 6.

The configuration files can be transported (e.g., communicated) in the network of the lighting system 5, e.g., through the cables 4 or through wireless links. A configuration file of a single fixture 1 can be edited by the plugged in hardware user interface 3 in its first operation mode. A configuration file of an array 6 of fixtures 1 can be edited by the unplugged hardware user interface 3 in its second operation mode.

In an embodiment each controllable lighting fixture 1 or lighting fixture array 6 of the lighting system 5 comprises a unique device identifier (ID) for identification of the respective controllable lighting fixture 1 or lighting fixture array 6 by a controller, in particular by a remote device management (RDM) controller of the lighting system 5.

In a possible implementation a lighting fixture array composed of lighting fixtures 1 does report its structural composition and/or its arrangement topology to the lighting system console 7 and/or to the extractable hardware user interface 3 and receives in a unique identifier (ID) in return.

A hardware user interface 3 provided in a lighting fixture 1 of an arrangement according to the present invention can effectively take control (not only for setup, but also for performing lighting tasks) for as many lighting fixtures 1 as needed in the same network, In particular in the same Ethernet network. This is a great achievement because conventional fixtures in a conventional lighting system each require its own onboard user interface, i.e., one user interface is required per lighting fixture. In a conventional lighting system, there are only two ways to control multiple lighting fixtures 1 manually. The first option for a user is to go to each individual onboard user interface to change parameters for the respective lighting fixture 1. This is very cumbersome and time consuming, and physically dependent on hardware operations for repeated routines from fixture to fixture. As a second alternative option, a host/client or master/slave mode can be employed. However, this means that all lighting fixtures 1 will behave exactly the same way as the first one, without any possibility for independent control of the lighting fixtures 1.

The method according to the present Invention offers additional ways of lighting fixture control. The method offers a user the possibility to control with one extractable user interface 3 (it can be removed from an integrated bay 2 provided in the housing of the fixture 1), as many individual units as available in the network in a completely independent manner, as can be done via a console 7 (even from different models). The extracted user interface 3 can then be put back by the user in one of the lighting fixtures 1 so that it behaves now like an onboard user interface, i.e., it operates as a regular display of the respective lighting fixture 1 in a first operation mode.

The method further offers a user the possibility of creating an array 6 of lighting fixtures 1 that can be mounted together in a yoke and be treated as one single unit when manually controlled. In this manner control of multiple lighting fixtures 1 in the network via one hardware user interface 3 can be extended to provide an independent control of several arrays 6 of lighting fixtures 1. For example each lighting fixture array 6 may comprise up to three units or lighting fixtures 1 as shown in FIGS. 3A, 3B.

The method further offers the user the possibility of treating lighting fixture arrays 6 in the console of the lighting system 5 as single units with extra parameters to control. For instance, three different lighting fixtures 1 may not require three complete full DMX profiles (3 dimmers, 3 strobes, etc.) but only master DMX channels (1 for dimmer, 1 for strobe, etc.) while keeping the same control over the pixels (1 unit means 8 RGBACL pixels to control, 2 in an array means 16, 3 in an array means 24).

The method according to the present invention provides a lighting system 5 offering a user the possibility of stacking, configuring, grouping and controlling multiple lighting fixtures 1 as one single lighting fixture array 6 or several groups of arrays, using a network running a communication protocol with the help of a user-friendly graphical interface GUI embedded in both one single hardware control panel 3 or in external software.

Users are limited in conventional systems to build complex arrays that do not recognize other fixtures in the same system, and with no tools for setting them up or controlling them directly from a user interface, so that multiple lighting fixtures 1 can act as one device.

The described method provides a significant advantage, since it provides a user-friendly and fast modular lighting system 5 based on high-output standardized luminaries.

The method can be implemented in a control panel or external software. The method allows users to set up, configure, group and control up to a predefined number M of lighting fixtures 1 in one fell swoop, but also as many lighting fixtures 1 as available in the same network, using one single user interface device 3.

Users are able to use up to a predefined number M of lighting fixtures 1 in the network with just one DMX profile, and/or one control panel 3. Users are able to set an order for controlling each unit in the lighting fixture array 6, and in a larger setup, they are able to address DMX, change settings in the menus, or operate lighting fixtures 1 from one single access point to each lighting fixture array 6 connected to the network.

The hardware-based system is able to recognize in a possible embodiment the length of each network cable 4, so that the user interface control panel 3 automatically creates a group of lighting fixtures 1 with the right order (top, medium, and bottom) for up to a predefined number M of e.g. M=3 fixtures in the same lighting fixture array 6 as shown in the exemplary embodiment of FIGS. 3A,3B. As a consequence, users do not need to identify and group the lighting fixtures 1 themselves, if the network cables 4 are connected in a defined sequence, following a color code.

What is claimed is:

1. A method of operating a lighting arrangement comprising at least one of lighting fixtures and lighting fixture arrays composed of lighting fixtures, wherein the lighting fixtures and lighting fixture arrays of the lighting arrangement are controlled using an extractable hardware user interface, and wherein a lighting fixture array comprises a configurable array topology describing the structural arrangement of the lighting fixtures within the lighting fixture array.

2. The method of claim 1 wherein the extractable hardware interface is extracted from an inbuilt bay of a lighting fixture of the lighting arrangement.

3. The method of claim 1 wherein a lighting fixture array comprises a number M of lighting fixtures mounted together in a yoke.

4. The method of claim 1 wherein, if the extractable hardware user interface is put into an integrated bay of a lighting fixture it operates as a local onboard user interface for controlling operations of the respective lighting fixture or for controlling operations of a lighting fixture array comprising the respective lighting fixture.

5. The method of claim 1 wherein setup operations and lighting operations of the lighting fixtures or the lighting fixture arrays within the lighting arrangement are controlled manually by a user using of the extractable hardware user interface.

6. The method of claim 1 wherein the lighting fixtures and/or lighting fixture arrays can after setup be controlled manually by the hardware user interface or remotely by a console of a lighting system via a control interface in accordance with a communication protocol.

7. The method of claim 6 wherein the communication protocol comprises a DMX communication protocol having a predetermined number k of available DMX channels.

8. The method of claim 7 wherein a number of DMX channels reserved for a lighting fixture array depends on the number M of lighting fixtures mounted together in the respective lighting fixture array.

9. The method of claim 1 wherein a number M of lighting fixtures are serially interconnected via cables to form a composite lighting fixture array of the lighting arrangement.

10. The method of claim 9 wherein the cables are Ethernet cables.

11. The method of claim 9 further comprising transmitting control signals between the lighting fixtures of the lighting fixture array and the extractable hardware user interface and between the lighting fixtures of the lighting fixture array and a console of the lighting system over the serially connected cables.

12. The method of claim 9 wherein the lighting fixtures serially interconnected via the cables are configured by a user using the extractable hardware user interface as lighting fixtures to be operated as a single lighting device in a recognized or assigned connection order or as lighting fixtures to be operated independently.

13. A method of operating a lighting arrangement comprising at least one of lighting fixtures and lighting fixture arrays composed of lighting fixtures, wherein the lighting fixtures and lighting fixture arrays of the lighting arrangement are controlled using an extractable hardware user interface, wherein a number M of lighting fixtures are serially interconnected via cables to form a composite lighting fixture array of the lighting arrangement, wherein the lighting fixtures serially interconnected via the cables are configured by a user using the extractable hardware user interface as lighting fixtures to be operated as a single lighting device in a recognized or assigned connection order or as lighting fixtures to be operated independently, and wherein a connection order of the serially interconnected lighting fixtures is recognized automatically depending on at least one of a detected cable length of the connecting cables and an internal wiring of the connecting cables.

14. A method of operating a lighting arrangement comprising at least one of lighting fixtures and lighting fixture arrays composed of lighting fixtures, wherein the lighting fixtures and lighting fixture arrays of the lighting arrangement are controlled using an extractable hardware user interface, wherein a number M of lighting fixtures are serially interconnected via cables to form a composite lighting fixture array of the lighting arrangement, and wherein the cables interconnecting the lighting fixtures are color-coded.

15. The method of claim 14 wherein the color-coded cables each indicate at least one of a cable length of the cable and a connection order of the cables within the lighting arrangement.

16. The method of claim 1 wherein each lighting fixture of the lighting fixture array has a position within the arrangement topology of the lighting fixture array assigned to the respective lighting fixture and adjustable as a configuration parameter.

17. The method of claim 7 wherein a lighting fixture array composed of lighting fixtures is controlled by the console of the lighting system via assigned DMX channels of the communication protocol according to set configuration parameters of a DMX profile for simultaneous setting of all lighting fixtures of the lighting fixture array.

18. The method of claim 1 wherein the lighting fixtures are mechanically connected to each other as lighting modules to form the composite lighting fixing array by means of mechanical connection elements.

19. The method of claim 18 wherein the mechanical connecting elements are provided in a frame of the lighting fixtures.

20. The method of claim 18 wherein the mechanically assembled lighting fixtures form a unitary two-dimensional lighting surface of the lighting fixture array.

21. The method of claim 1 wherein the mechanically assembled lighting fixtures are powered by associated power supply units connected to a common power supply socket of the lighting fixture array.

22. The method of claim 1 wherein the lighting fixtures comprise high power lighting fixtures each having a power consumption of more than 500 Watt.

23. The method of claim 12 wherein control signals are transmitted between a lighting arrangement of lighting fixtures configured as a controllable lighting device and other lighting devices of the lighting system via a common serial bus or via a wireless or wired data network.

24. The method of claim 1 wherein the extractable hardware user interface comprises a graphical user interface.

25. The method of claim 1 wherein the lighting fixtures comprise one or more of light panels, dimmers, light heads, spotlights, scanners, strobes, laser devices, moving heads and lighting modules that are mechanically connectable to each other.

26. The method of claim 1 wherein each controllable lighting fixture or controllable lighting fixture array of the lighting system is controlled by means of an associated assigned bus address for reception of control signals.

27. The method of claim 1 wherein a configuration file of a user mode generated for a lighting fixture array is stored in at least one of a configuration memory of a lighting fixture of the lighting arrangement, a configuration memory of the extractable hardware user interface connected to an inbuilt bay of a lighting fixture of the lighting fixture array, and a configuration memory of a console of the lighting system.

28. The method of claim 1 wherein each controllable lighting fixture or lighting fixture array of the lighting system comprises a unique device identifier for identification of the respective controllable lighting fixture or lighting fixture array by a controller.

29. The method of claim 18 wherein the controller is a remote device management (RDM) controller.

30. The method of claim 1 wherein a lighting fixture array composed of lighting fixtures reports its structural composition and/or its arrangement topology to at least one of a lighting system console and the extractable hardware user interface, receiving a unique identifier in return.

* * * * *